Feb. 10, 1970   F. FARLEY   3,494,647
CORNER CAP FOR METAL WINDOW FRAME
Filed Sept. 13, 1968
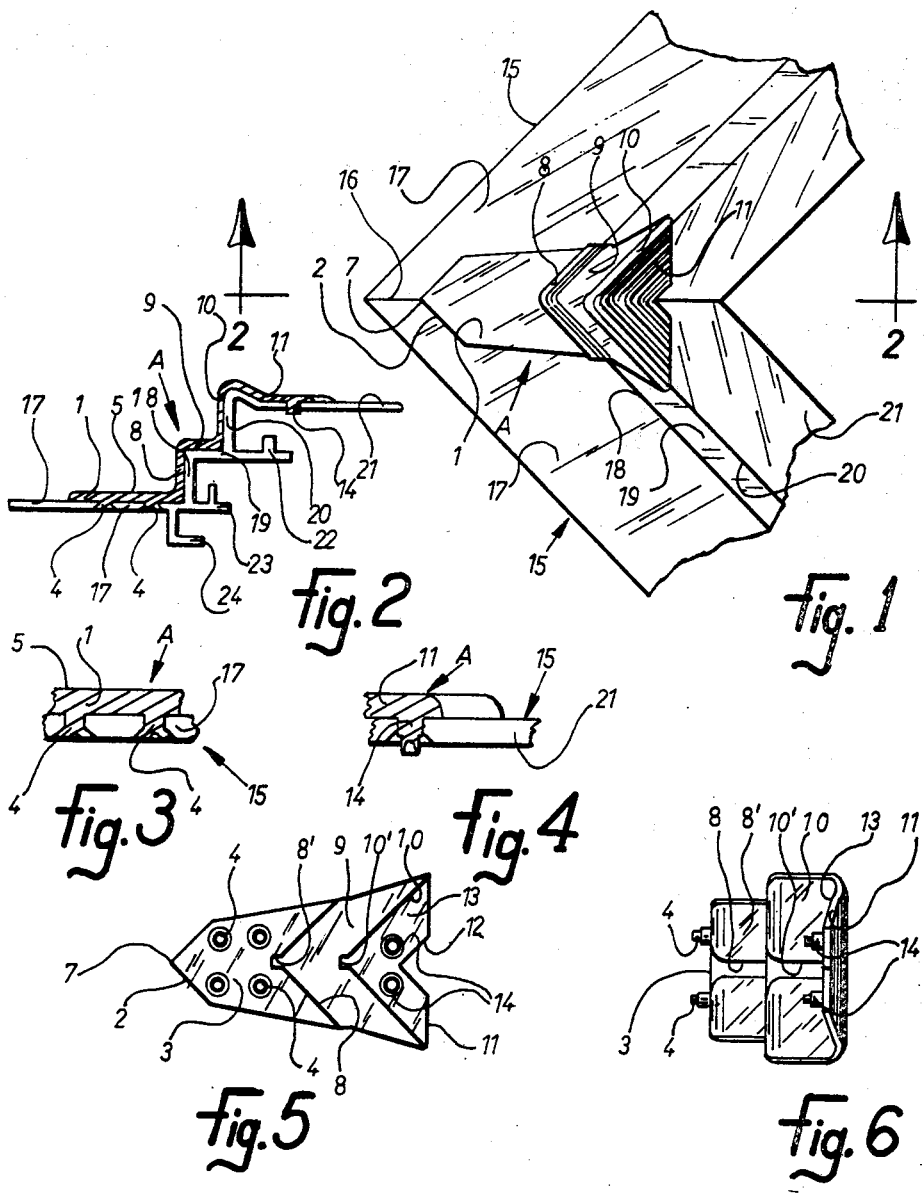
INVENTOR
Frank FARLEY
BY Pierre Lesperance
AGENT United States Patent Office 3,494,647
Patented Feb. 10, 1970

3,494,647
CORNER CAP FOR METAL WINDOW FRAME
Frank Farley, 101 Picardie St., Preville, Quebec, Canada
Filed Sept. 13, 1968, Ser. No. 759,657
Int. Cl. F16b 1/00, 3/00, 5/00, 7/00
U.S. Cl. 287—189.36                            5 Claims

ABSTRACT OF THE DISCLOSURE

A corner cap for assembling stepped shaped extruded window frame sections, provided with rivet stems engageable with only the outer main flanges of the frame sections and with additional studs engageable with the innermost steps of the frame sections, these studs requiring no rivetting and serving together with the rivets to secure the frame sections.

---

The present invention relates to metal window frames and, more particularly, to means for rigidly assembling extruded metal members, preferably aluminum members, to form a window frame.

In the construction of metal window frames from extruded sections, the sections are cut at a 45° bevel and joined together by means of so-called corner caps.

These extruded sections define in cross-sections a main flange and two or more step portions upstanding from said main flange and providing inside guide rails for the window panes and screen.

It is highly important that these extruded sections be assembled in a very quick and yet accurate manner for economy of manufacturing and correct fitting of the sections to obtain adequate quality of the product and a minimum of air leaks at the joints between the sections.

The corner cap must also form a rigid connection so that the window frame will not warp under stress.

One known type of corner cap systems comprises two separate corner cap elements: a main corner cap engaging the abutting main flanges and part of the adjacent step right angled surfaces of the extruded sections, and the second corner cap engaging the top step and the adjacent right angled surfaces of the abutting extruded sections. These two cap elements are each provided with integral rivet stems passing through the material of the sections and flattened at the inside faces of said sections. Thus, for each frame there are required eight cap elements and, although the rivets of the main cap may be easily accessible, the rivets of the second cap element are difficult to reach and rivet. Moreover, part of the corner of the assembled extruded sections remains exposed and air is liable to enter the joint.

An improvement over this previously described known assembly of cap elements consists in making a single cap element for each joint covering the main flanges and all of the steps and right angled surfaces of the extruded section. However, this known cap element requires screws and inside nut pieces for receiving the screws. These nut pieces and screws add to the number of pieces of the assembly and the caps require a screwing operation in addition to the riveting operation. Moreover, the screw heads form unsightly bosses at the exposed surface of the frame.

It is accordingly the general object of the present invention to provide a corner cap of improved construction and the attaching of which is much faster than previous corner cap systems, which covers practically the entire junction line and which results in a more rigid joint of the two extruded sections of the window frame, which requires only four parts for an entire window frame and which imparts good appearance to the window frame.

Another object of the present invention resides in the provision of a corner cap of the character described, provided with integral rivet stems adapted to engage the main flange only, said cap being provided with additional studs adapted to engage the innermost step of the two abutting extruded sections, said studs requiring no rivetting and yet serving, along with the rivets, to hold and secure the extruded sections firmly one to another. Thus, only one rivetting operation is required to install the cap.

The foregoing and other important objects of the present invention will become more apparent during the following disclosure and by referring to the drawings, in which:

FIGURE 1 is a partial top plan view of two assembled extruded sections of a metal window frame joined together by means of the corner cap in accordance with the invention;

FIGURE 2 is a cross-section taken along line 2—2 of FIGURE 1;

FIGURE 3 is a partial longitudial section, on an enlarged scale, of the assembled main flange of the corner cap and main flange of an extruded section;

FIGURE 4 is a partial section, on an enlarged scale, of the assembled innermost steps of the corner cap and extruded section;

FIGURE 5 is a bottom plan view of the corner cap; and

FIGURE 6 is a rear end elevation of the corner cap.

Referring now more particularly to the drawings in which like reference character indicate like elements throughout, the corner cap A of the invention comprises a flat main flange 1 having a bevelled outer end 2, an inside flat face 3 provided with integral rivet stems 4, preferably four in such stems, arranged at the four corners of a square. The outside face 5 of main flange 1 is flat with rounded edges 6. The inner end of wall 1 forms a V along the edges of which are formed integral upstanding walls 8 in planes at right angle to main wall 1 and meeting together along the median longitudinal axis of main flange 1 and inclined at 45° angle to said median axis.

Integral with the top edge of the walls 8, is a flat step 9 lying in a plane parallel to the plane of main flange 1 and forming a step surface of V-shaped outline when shown in top plan view. At the inner V-shaped edge of the step 9, are provided a second pair of upstanding walls 10, which are at right angles to step 9 and therefore lie in planes parallel to the respective walls 8, but are recessed from the same.

The top edges of the upstanding walls 10 are each provided with an inwardly directed flange 11, preferably formed with a V-shaped notch 12 at the centre thereof. Flange 11 is provided at its inside face 13 with a pair of studs 14 disposed on each side of the median axis of the corner cap.

This corner cap A serves to join together two extruded section 15 of a metal window frame. The sections 15 must be joined at right angles to each other, and for this purposes their ends are cut at 45° angle, as shown at 16. These sections, when seen in cross-section or in end view, comprise a normal main flange 17 followed on the outside by a right angled wall 18, in turn followed by a step wall 19 parallel to main flange 17, in turn followed by a right angled wall 20 parallel to wall 18, but recessed with respect to the same, the latter being provided at its outer edge with inwardly directed flange 21.

On the inside of the sections 15, there are further provided the usual flanges 22, 23, 24 serving as guide rails for the window panes and the screen. In the usual construction, the guide rail 22 is very close to the flange 21.

To assemble the two sections 15, each section is drilled near their bevelled end edges 16 to provide a pair of holes in the main flange 17 and one hole in the top flange 21. These holes, when the two sections are assembled, are adapted to receive the four rivet stems 4 and the two studs 14 of the corner cap respectively. Thus, the corner cap is pressed flat against the outside face of the assembled window frame sections 15 until the stems 4 and studs 4 enter the respective holes. In this position, the main flange 1 of cap 4 is applied flat against and straddles the main flanges 17 of the assembled sections 15.

The right angle upstanding walls 8 of the cap A fit against the two walls 18 of the respective assembled sections 15. The step 9 of the cap A fits over the step walls 19 of the two assembled sections 15; the walls 10 of cap A fits against the upstanding walls 20 of the assembled sections 15 and, finally, the flange 11 of the corner cap A fits over the top flanges 21 of the assembled sections 15.

The rivet stems 14 need only be flattened at the inside face of the main flanges 17 of the assembled sections 15. This causes the cap A to fit tightly against the respective surfaces of the assembled sections 15 and firmly hold the studs 14 within their respective holes, and these studs 14 need not be rivetted or flattened. Thus, only a single simultaneous rivetting operation of the four rivets 4 is effected. This automatically produces the firm engagement of the studs 14 in their holes and the assembly is firmly held together; the two sections 15 are in their correct assembled position and cannot become bent or warped, even under relatively large bending forces.

The corner cap A overlaps and makes a seal over the major part of the joint between the two window frame sections 15. There are only four caps required for each window frame without any other accessory pieces. There is only one rivetting operation for simultaneously rivetting the four rivets 4, while the studs 14 which are relatively inaccessible, are not rivetted.

While a preferred embodiment in accordance with the invention has been illustrated and described, it is understood that various modifications may be resorted to.

What I claim is:

1. A corner cap for joining two extruded sections of a metal window frame or the like at right angles to each other, comprising a main flange having an inside flat surface, rivet stems protruding from said inside surface, upstanding wall sections integral with one end of said main wall and making a right angle with respect to each other and each at right angles to said main wall, the outer edge of said wall sections carrying an inwardly directed flange in a plane parallel to said main flange and having an inside surface and studs protruding from said last named inside surface and directed in the same direction as said rivet stems.

2. A corner cap as claimed in claim 1, wherein said rivet stems are disposed at the four corners of a square figure and equally distant from the median longitudinal axis of said cap, and similarly the said studs are equally disposed on each side of said longitudinal axis.

3. A cap member as claimed in claim 1, further including an inwardly directed step integral with the upper edge of said upstanding wall sections and lying in a plane parallel to the plane of said main flange, second wall sections upstanding from the inner edge of said step making a right angle with each other and at right angles to said main flange, said stud carrying flange being integral with the top edges of said second wall sections.

4. A cap member as claimed in claim 2, further including an inwardly directed step integral with the upper edge of said upstanding wall sections and lying in a plane parallal to the plane of said main flange, second wall sections upstanding from the inner edge of said step making a right angle with each other and at right angles to said main flange, said stud carrying flange being integral with the top edges of said second wall sections.

5. A window frame comprising four extruded metal sections having bevelled 45° end edges abutting each other to form a joint and a cap member overlying said joint at each corner of said frame, said metal sections providing a main flange and at least two offset step surfaces and intermediate right angled wall sections, and cap member shaped to overlap said main flange, said step surfaces and said wall sections, said cap member having a main flange having rivet stems formed at its inside surface and protruding therefrom and engageable with holes made in said main flanges of said window sections and riveted at the inside face of said main flanges of said window frame sections, the portion of said cap overlying the last step surfaces of said metal sections, provided with protruding studs frictionally engaging holes made in the last step surfaces of said extruded metal sections.

References Cited

UNITED STATES PATENTS

| | | |
|---|---|---|
| 1,402,304 | 1/1922 | Lord. |
| 1,969,014 | 8/1934 | Karp. |
| 2,067,727 | 1/1937 | Peister. |

FOREIGN PATENTS 330,594  7/1958  Switzerland.

MARION PARSONS, Jr., Primary Examiner

U.S. Cl. X.R.

287—20.92